United States Patent
Rodden et al.

(12) 
(10) Patent No.: US 6,463,886 B1
(45) Date of Patent: Oct. 15, 2002

(54) HOIST DEVICE

(76) Inventors: Laurie J. Rodden, 44434 SE. Coalman Rd, Sandy, OR (US) 97055; Michael L. Fray, 67674 E. Barlow Trail Rd, Rhododendron, OR (US) 97049

( * ) Notice: Subject to any disclaimer, the term of this patent is extended or adjusted under 35 U.S.C. 154(b) by 0 days.

(21) Appl. No.: 10/056,527

(22) Filed: Jan. 25, 2002

(51) Int. Cl.$^7$ .............................................. A01K 15/04
(52) U.S. Cl. ...................................... 119/728; 119/712
(58) Field of Search ................................ 119/725, 712, 119/753, 770, 769, 722, 724, 723, 728

(56) References Cited

U.S. PATENT DOCUMENTS

| | | | |
|---|---|---|---|
| 4,432,306 A | * 2/1984 | Rossa | .......................... 119/725 |
| 4,489,677 A | 12/1984 | Handley | |
| 4,559,906 A | 12/1985 | Smith | |
| 4,767,099 A | * 8/1988 | Munks | ........................ 119/725 |
| 4,831,967 A | 5/1989 | Anderson | |
| D311,804 S | 10/1990 | Eliasson | |
| 5,150,667 A | 9/1992 | Salidrigas | |
| 5,842,443 A | 12/1998 | Steinfort | |

FOREIGN PATENT DOCUMENTS

| | | | | |
|---|---|---|---|---|
| GB | 2095089 A | * | 9/1982 | .................. 119/728 |
| WO | WO 9109516 | * | 7/1991 | .................. 119/728 |

* cited by examiner

*Primary Examiner*—Charles T. Jordan
*Assistant Examiner*—Judith A. Nelson

(57) ABSTRACT

A hoist device includes an elongated tube that has a pair of bends therein such that the first end extends in a direction orientated generally perpendicular to a direction of extension of the second end. A platform has an upper surface and a bottom surface. The first end is attached to the upper surface such that the tube extends upwardly from the platform. An elongate flexible member has a free end that extends through the opening in the tube and extends through a length of the tube and outward through the second end of the tube. A motor is mounted on the platform and is mechanically coupled to the elongate flexible member. A lift bar is attached to the free end of the elongate flexible member. A harness includes a plurality of straps for positioning about an animal, fastening releasably fasten the harness to the lift bar.

17 Claims, 6 Drawing Sheets

HOIST DEVICE

BACKGROUND OF THE INVENTION

1. Field of the Invention

The present invention relates to animal hoist devices and a more particularly pertains to a new hoist device for facilitating the lifting of large dogs and other large animals for grooming and medical care.

2. Description of the Prior Art

The use of animal hoist devices is known in the prior art. U.S. Pat. No. 5,842,443 describes a device for lifting an animal. Another type of animal hoist devices is U.S. Pat. No. 4,831,967 having a lift frame. Still another type of animal hoist device is U.S. Pat. No. 4,489,677 having a support apparatus in the form of a stretcher.

While these devices fulfill their respective, particular objectives and requirements, the need remains for a system that includes certain improved features. The present invention includes an electromechanical crane in combination with an animal lift assembly for aiding the user in lifting the animal and positioning the animal where needed.

SUMMARY OF THE INVENTION

The present invention meets the needs presented above by providing a complete system including a crane, a support bar, and an animal support harness in an easy to use package.

Still yet another object of the present invention is to provide a new hoist device that be easy to install and operate and would aid the user in lifting large animals into a tub for bathing or onto a table for grooming.

Even still another object of the present invention is to provide a new hoist device that would also eliminate the risk of injury to the animal and the user. The present invention would also save the user time by not having to struggle to get the animal into the tub.

To this, the present invention generally comprises an elongated tube that has a first open end and a second open end. The elongated tube has a pair of bends therein such that the first end extends in a direction orientated generally perpendicular to a direction of extension of the second end. The tube has an opening therein positioned generally adjacent to the first end. A platform has an upper surface and a bottom surface. The first end is attached to the upper surface such that the tube extends upwardly from the platform. An elongate flexible member has a free end that extends through the opening in the tube and extending through a length of the tube and outward through the second end of the tube. A motor is mounted on the platform and mechanically coupled to the elongate flexible member for retracting and extending the elongate flexible member through the tube. A lift bar is attached to the free end of the elongate flexible member. A harness includes a plurality of straps for positioning about an animal, fastening means releasably fastens the harness to the lift bar.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
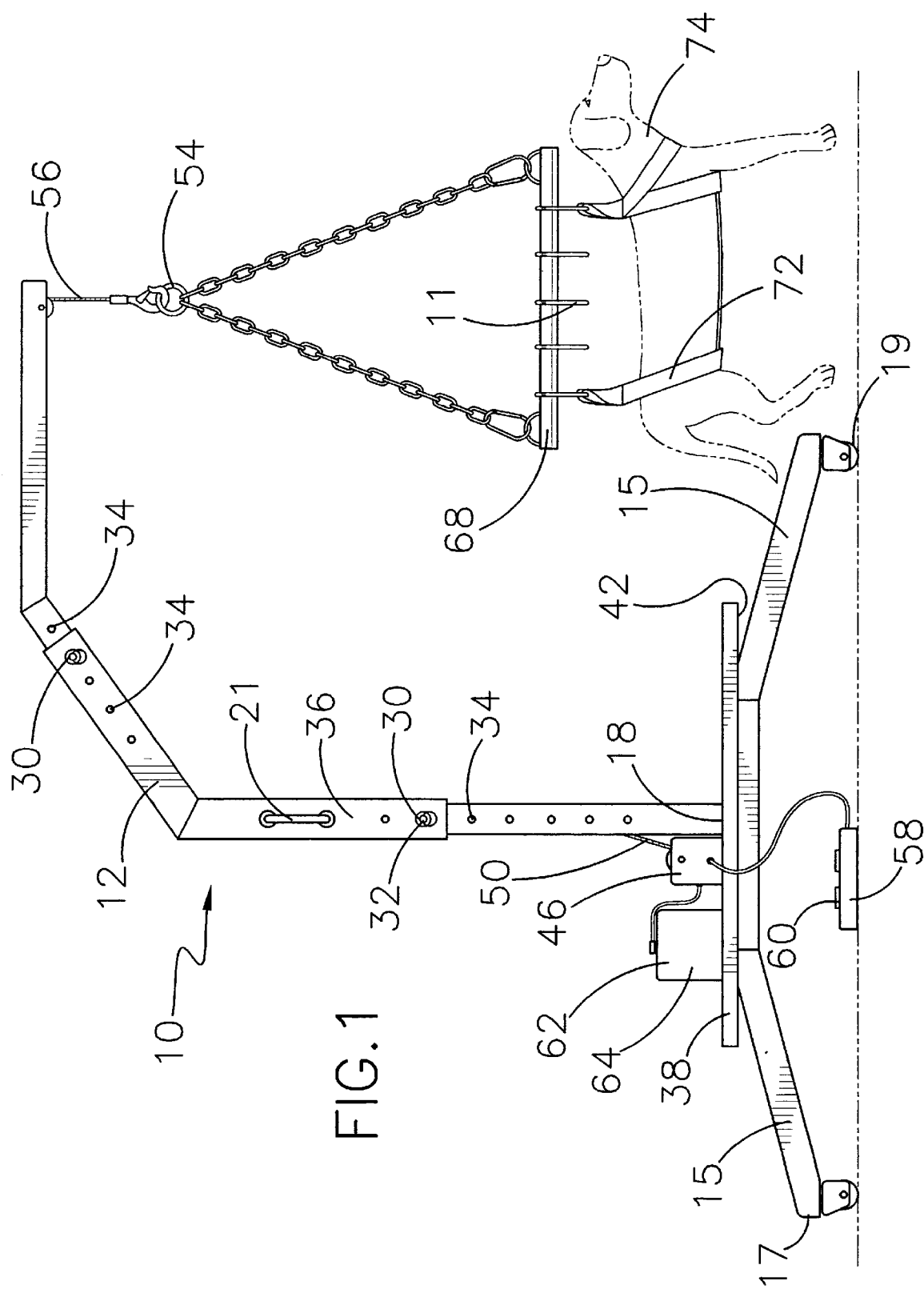
FIG. 1 is a side view of a new hoist device according to the present invention.
Figure 2:
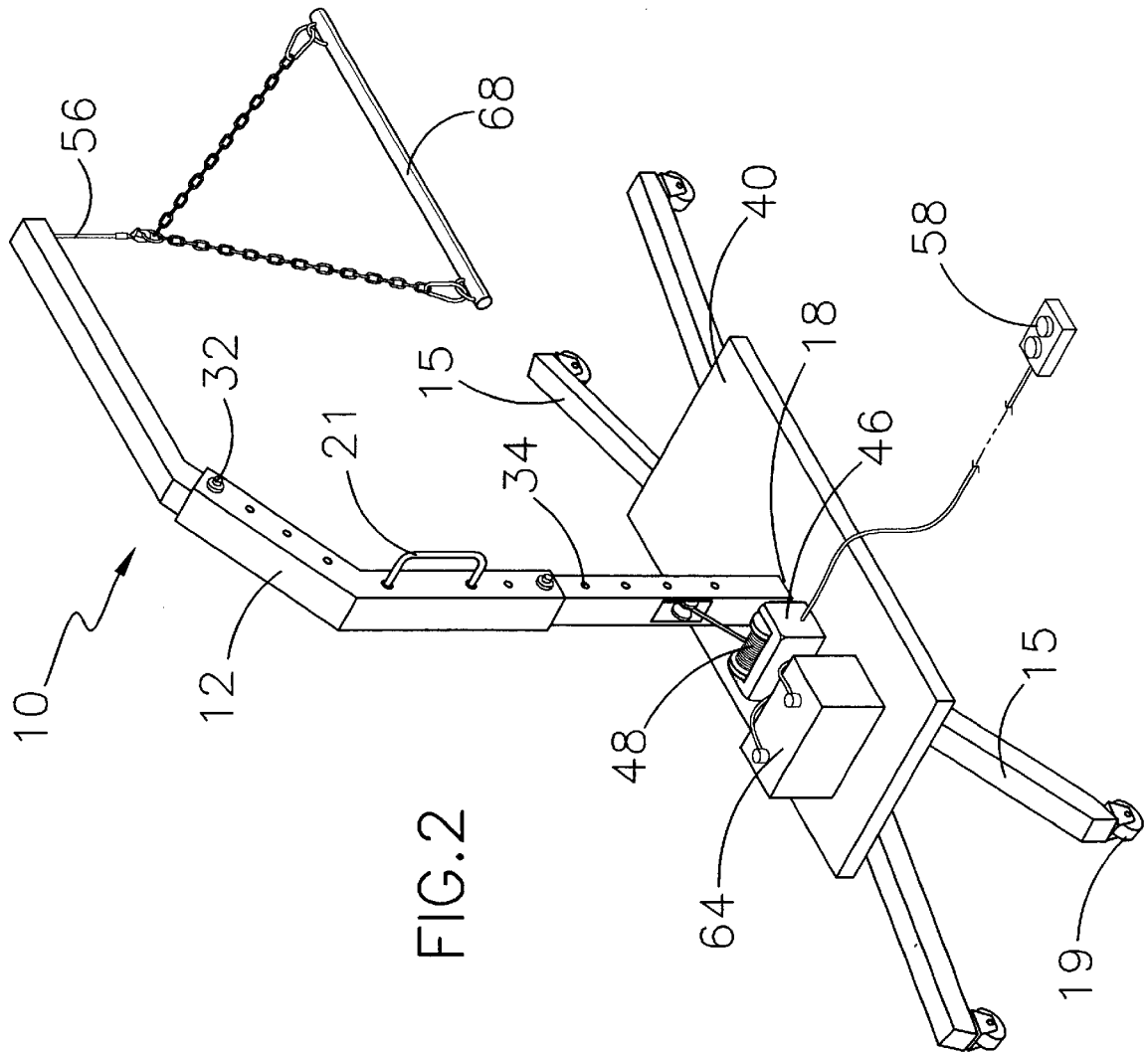
FIG. 2 is a perspective view of the present invention.
Figure 3:
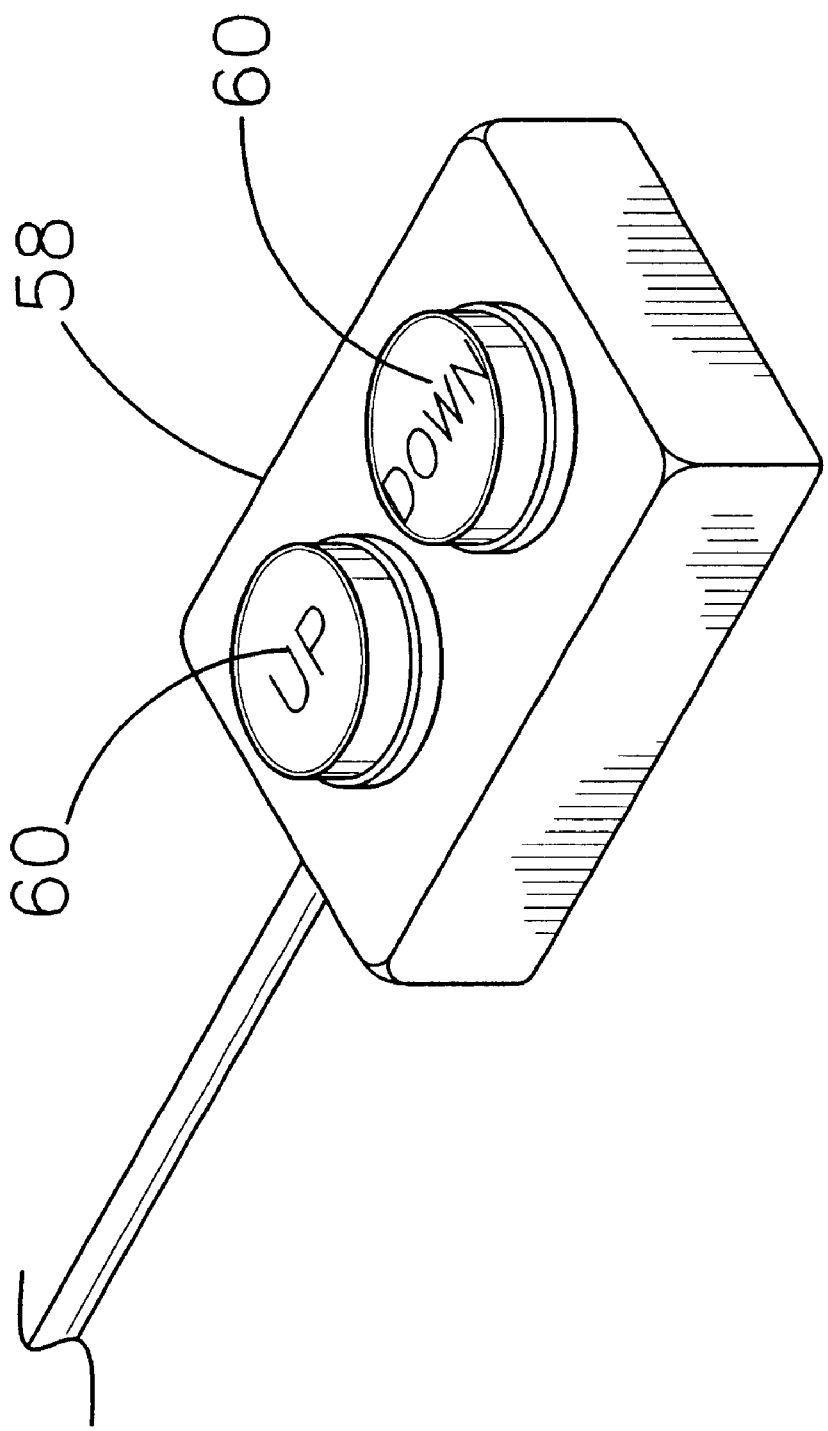
FIG. 3 is a perspective view of the present invention.
Figure 4:
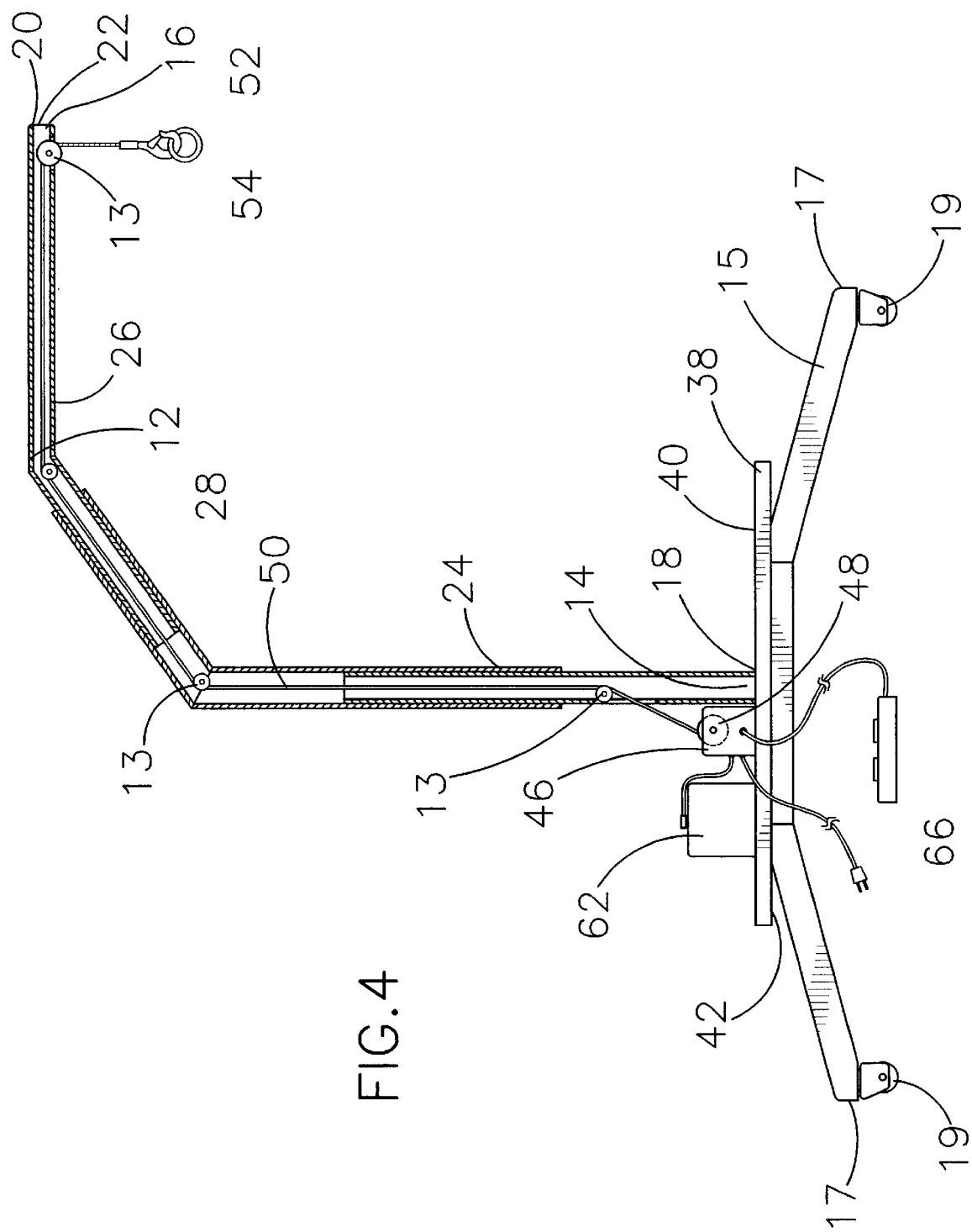
FIG. 4 is a side view of the present invention.
Figure 5:
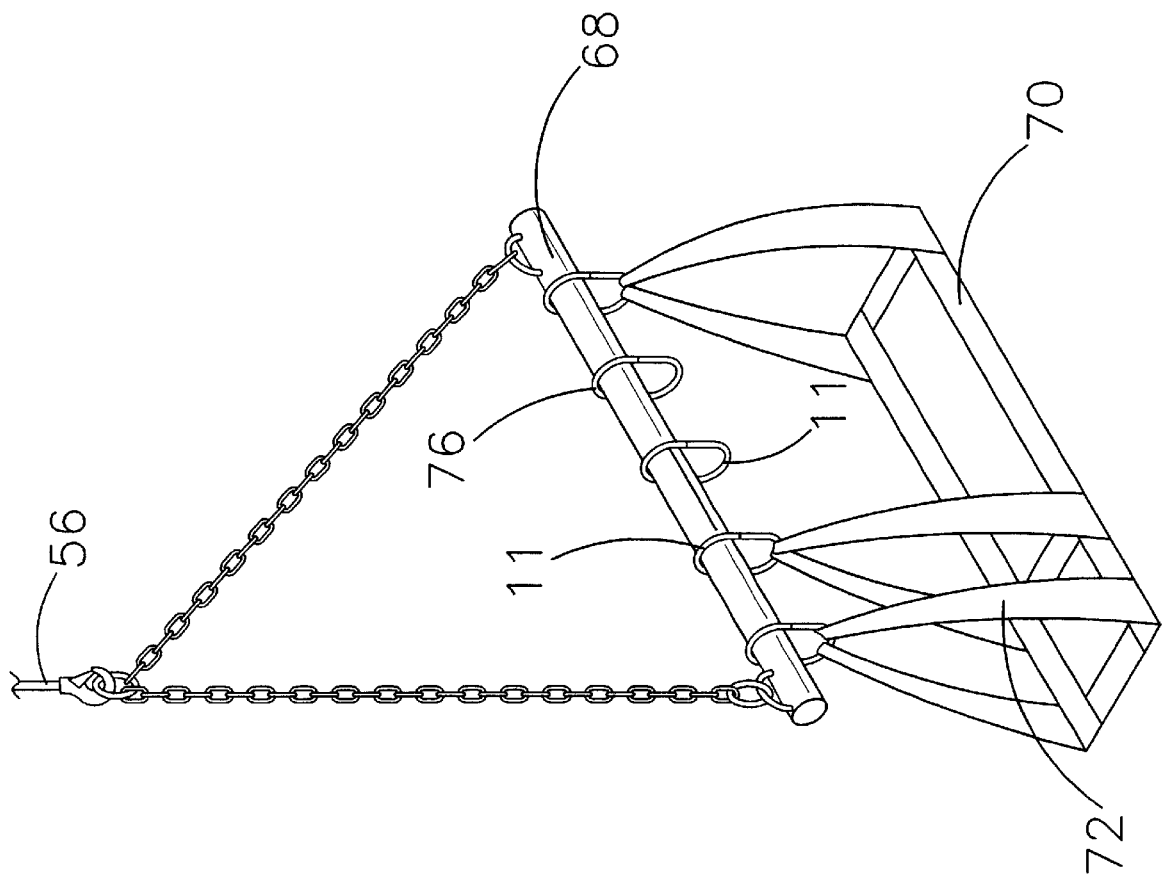
FIG. 5 is a perspective view of the present invention.
Figure 6:
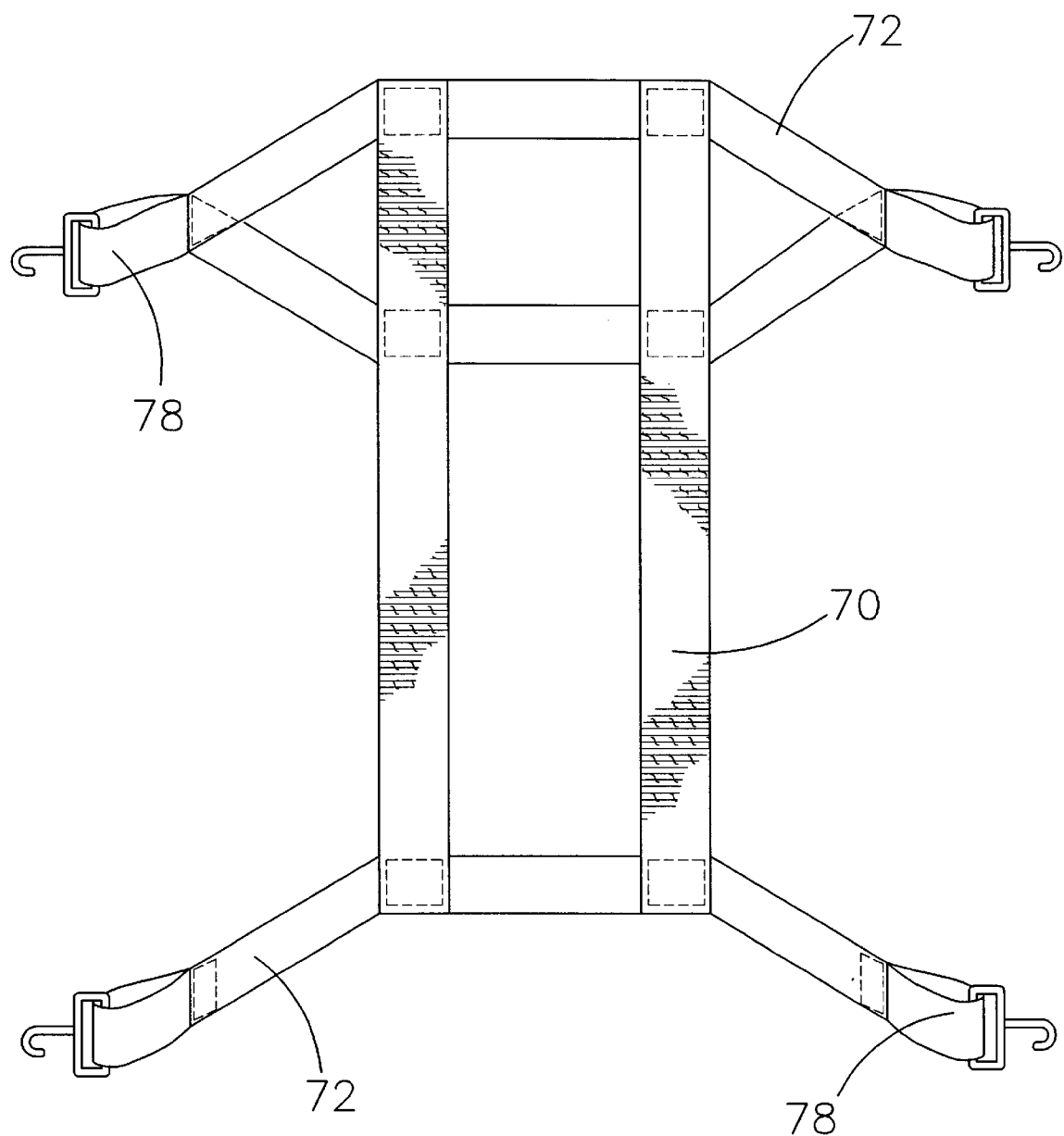
FIG. 6 is a top view of the present invention.

With reference now to the drawings, and in particular to FIGS. 1 through 6 thereof, a new hoist device embodying the principles and concepts of the present invention and generally designated by the reference numeral 10 will be described.

As best illustrated in FIGS. 1 through 6, the hoist device 10 generally comprises an elongated tube 12 has a first open end 14 and a second open end 16. The elongated tube 12 has a pair of bends therein such that the first end 18 extends in a direction orientated generally perpendicular to a direction of extension of the second end 20. The tube 12 has an opening 22 therein positioned generally adjacent to the first end 18. The elongated tube 12 includes a first portion 24 adjacent to the first end 18, a second portion 26 adjacent to the second end 20 and a middle portion 28 positioned between the first 24 and second portions 26. The first 24 and second portions 26 are removably extendable into the middle portion 28.

A securing means 30 releasably secures the middle portion 28 to the first 24 and second portions 26. The securing means 30 includes a plurality of rods 32 removably extendable through apertures 34 in the first 24, second 26 and third portions 36.

A platform 38 has an upper surface 40 and a bottom surface 42. The first end 18 is attached to the upper surface 40 such that the tube 12 extends upwardly from the platform 38.

A motor 46 is mounted on the platform 38. A spool 48 is mechanically coupled to the motor 46. The motor 46 is a reversible motor 46 such that the motor 46 may selectively rotate the spool 48 in a first direction and a second direction.

An elongate flexible member 50 is wound about the spool 48. A free end 52 of the elongate flexible member 50 extends through the opening 22 in the tube 12 and extends through a length of the tube 12 and outward through the second end 20 of the tube 12. The free end 52 includes a loop 54. The elongate flexible member 50 includes a cable 56.

A control 58 is operationally coupled to the motor 46 for selecting a rotation of the motor 46. The control 58 includes at least two buttons 60. A first of the buttons 60 actuates the motor 46 in a first direction. A second of the buttons 60 actuates the motor 48 in a second direction.

A power supply 62 is operationally coupled to the motor 46. The power supply 62 includes a battery 64 positioned on the platform 38. The power supply 62 could also consist of an electrical plug 66 for coupling into an outlet.

A lift bar 68 is attached to the free end 52 of the elongate flexible member 50. The lift bar 68 is orientated generally horizontal. A harness 70 includes a plurality of straps 72 for positioning about an animal 74. A fastening means 76 releasably fastens the harness 70 to the lift bar 68. The fastening means 76 includes a plurality of loop members 78 positioned on the lift bar 68 and a plurality of hooks 11 attached to the harness 70. Each of the hooks 11 is selectively extendable through loop members 78.

A plurality of pulleys 13 is rotatably attached to and positioned within the tube 12. The pulleys 13 are spaced from each other. The elongate flexible member 50 is positioned on the pulleys 13 for facilitating movement of the elongate flexible member 50 through the tube 12. A plurality of legs 15 is attached to the bottom surface 42 of the platform 38. Each of the legs 15 has a distal end 17 with respect to the platform 38. Each of a plurality of wheels 19 is attached to one of the distal ends 17 of the legs 15.

A handle 21 is attached to the tube 12, the handle 21 is positioned on the middle portions 28 of the tube 12.

In use, the user would secure the harness around the animal and then fasten the harness to the lift bar. The user would then use the control to raise and lower the animal as needed to position the animal on an examining table or into a bath. The tube is telescoping so that the device may accommodate higher tables.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An animal hoist device for lifting a dog or other animal off a floor surface, said device comprising:
   an elongated tube having a first open end and a second open end, said elongated tube having a pair of bends therein such that said first end extends in a direction orientated generally perpendicular to a direction of extension of said second end, said tube having an opening therein positioned generally adjacent to said first end;
   a platform having an upper surface and a bottom surface, said first end being attached to said upper surface such that said tube extends upwardly from said platform;
   an elongate flexible member having a free end extending through said opening in said tube and extending through a length of said tube and outward through said second end of said tube;
   a motor being mounted on said platform and mechanically coupled to said elongate flexible member for retracting and extending said elongate flexible member through said tube;
   a lift bar being attached to said free end of said elongate flexible member;
   a harness including a plurality of straps for positioning about an animal, fastening means releasably fasten said harness to said lift bar.

2. The animal hoist device as in claim 1, wherein said elongated tube includes a first portion adjacent to said first end, a second portion adjacent to said second end and a middle portion positioned between said first and second portions, said first and second portions being removably extendably into said middle portion, a securing means releasably secures said middle portion to said first and second portions.

3. The animal hoist device as in claim 2, wherein said securing means includes a plurality of rods removably extendable through apertures in said first, second and third portions.

4. The animal hoist device as in claim 1, further including a spool being mechanically coupled to said motor, said motor being a reversible motor such that said motor may selectively rotate said spool in a first direction and a second direction, said elongate flexible member being wound about said spool and extending from said spool through said tube.

5. The animal hoist device as in claim 1, further including a control being operationally coupled to said motor for selecting a rotation of said motor, said control including at least two buttons, a first of said buttons actuating said motor in a first direction, a second of said buttons actuating said motor in a second direction.

6. The animal hoist device as in claim 5, further including a power supply being operationally coupled to said motor, said power supply comprising a battery positioned on said platform.

7. The animal hoist device as in claim 1, wherein said fastening means including a plurality of loop members positioned on said lift bar and a plurality of hooks attached to said harness, each of said hooks being selectively extendable through loop members.

8. The animal hoist device as in claim 1, further including a plurality of pulleys being rotatably attached to and positioned within said tube, said pulleys being spaced from each other, said elongate flexible member being positioned on said pulleys for facilitating movement of said elongate flexible member through said tube.

9. The animal hoist device as in claim 1, further including a plurality of legs being attached to said bottom surface of said platform, each of said legs having a distal end with respect to said platform, each of a plurality of wheels being attached to one of said distal ends of said legs.

10. The animal hoist device as in claim 1, further including a handle being attached to said tube, said handle being positioned on said middle portions of said tube.

11. The animal hoist device as in claim 2, further including a spool being mechanically coupled to said motor, said motor being a reversible motor such that said motor may selectively rotate said spool in a first direction and a second direction, said elongate flexible member being wound about said spool and extending from said spool through said tube.

12. The animal hoist device as in claim 11, further including a control being operationally coupled to said motor for selecting a rotation of said motor, said control including at least two buttons, a first of said buttons actuating said motor in a first direction, a second of said buttons actuating said motor in a second direction.

13. The animal hoist device as in claim 12, further including a power supply being operationally coupled to said motor, said power supply comprising a battery positioned on said platform.

14. The animal hoist device as in claim 2, further including a plurality of pulleys being rotatably attached to and positioned within said tube, said pulleys being spaced from each other, said elongate flexible member being positioned on said pulleys for facilitating movement of said elongate flexible member through said tube.

15. The animal hoist device as in claim 14, further including a plurality of legs being attached to said bottom surface of said platform, each of said legs having a distal end with respect to said platform, each of a plurality of wheels being attached to one of said distal ends of said legs.

16. The animal hoist device as in claim 2, further including a plurality of legs being attached to said bottom surface of said platform, each of said legs having a distal end with respect to said platform, each of a plurality of wheels being attached to one of said distal ends of said legs.

17. An animal hoist device for lifting a dog or other animal off a floor surface, said device comprising:

an elongated tube having a first open end and a second open end, said elongated tube having a pair of bends therein such that said first end extends in a direction orientated generally perpendicular to a direction of extension of said second end, said tube having an opening therein positioned generally adjacent to said first end, said elongated tube including a first portion adjacent to said first end, a second portion adjacent to said second end and a middle portion positioned between said first and second portions, said first and second portions being removably extendably into said middle portion, a securing means releasably secures said middle portion to said first and second portions, said securing means including a plurality of rods removably extendable through apertures in said first, second and third portions;

a platform having an upper surface and a bottom surface, said first end being attached to said upper surface such that said tube extends upwardly from said platform;

a motor being mounted on said platform, a spool being mechanically coupled to said motor, said motor being a reversible motor such that said motor may selectively rotate said spool in a first direction and a second direction;

an elongate flexible member being wound about said spool, a free end of said elongate flexible member extending through said opening in said tube and extending through a length of said tube and outward through said second end of said tube, said free end comprising a loop, said elongate flexible member comprising a cable;

a control being operationally coupled to said motor for selecting a rotation of said motor, said control including at least two buttons, a first of said buttons actuating said motor in a first direction, a second of said buttons actuating said motor in a second direction;

a power supply being operationally coupled to said motor, said power supply comprising a battery positioned on said platform;

a lift bar being attached to said free end of said elongate flexible member, said lift bar being orientated generally horizontal;

a harness including a plurality of straps for positioning about an animal, fastening means releasably fastens said harness to said lift bar, said fastening means including a plurality of loop members positioned on said lift bar and a plurality of hooks attached to said harness, each of said hooks being selectively extendable through loop members;

a plurality of pulleys being rotatably attached to and positioned within said tube, said pulleys being spaced from each other, said elongate flexible member being positioned on said pulleys for facilitating movement of said elongate flexible member through said tube;

a plurality of legs being attached to said bottom surface of said platform, each of said legs having a distal end with respect to said platform, each of a plurality of wheels being attached to one of said distal ends of said legs;

a handle being attached to said tube, said handle being positioned on said middle portions of said tube.

\* \* \* \* \*